Dec. 20, 1966          J. RUBIN                3,292,384
   METHOD AND APPARATUS FOR CHILLING ARTICLES, ESPECIALLY
                 FOOD ITEMS, BY THE USE OF
                     POWDERED REFRIGERANT
Filed Feb. 28, 1966                         4 Sheets-Sheet 2
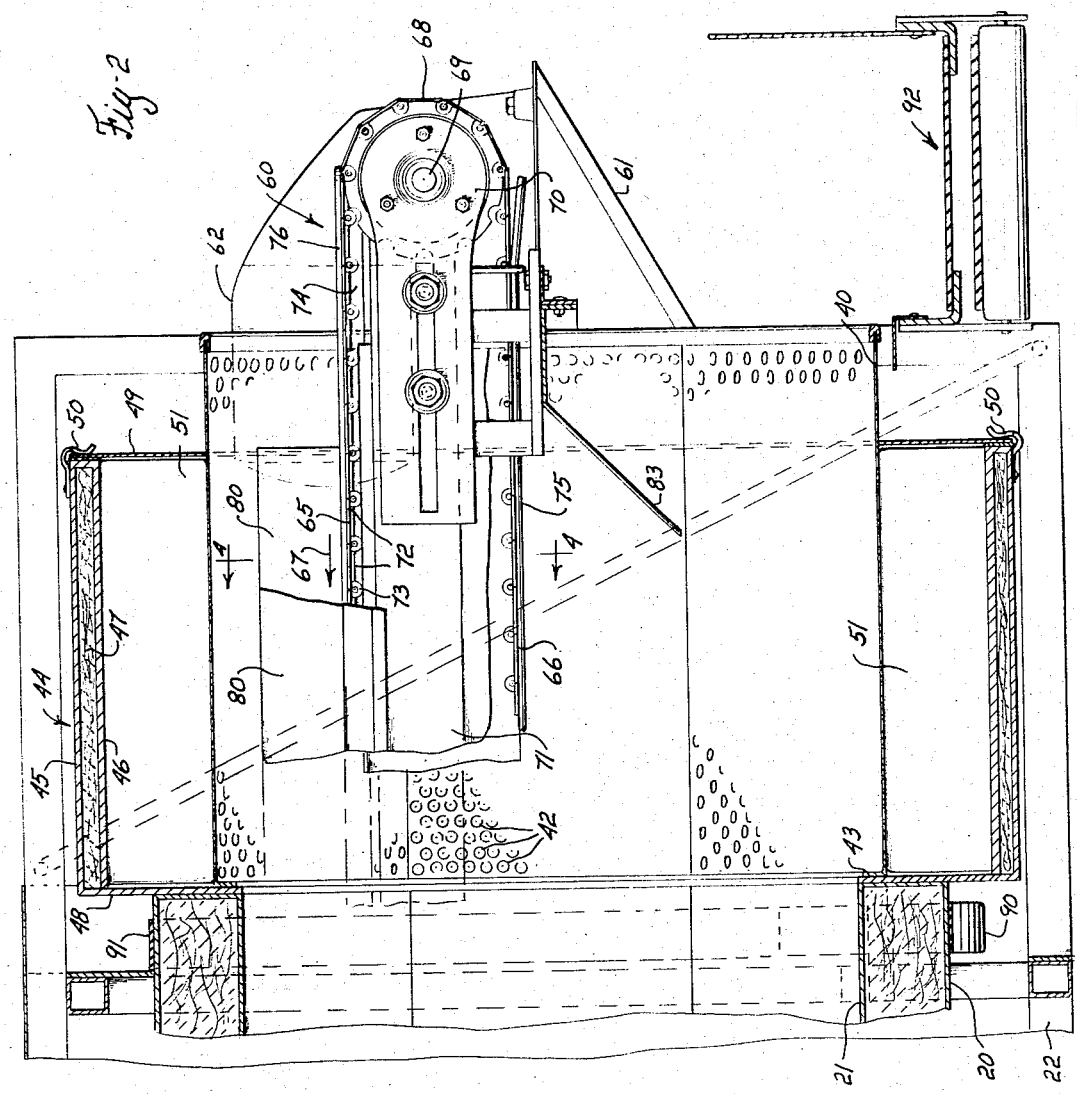
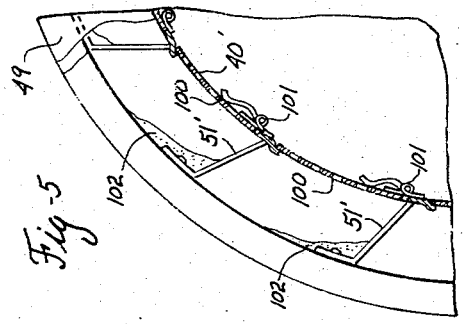
INVENTOR.
Julius Rubin
BY
Synnestvedt & Lechner
ATTORNEYS Dec. 20, 1966 J. RUBIN 3,292,384
METHOD AND APPARATUS FOR CHILLING ARTICLES, ESPECIALLY
FOOD ITEMS, BY THE USE OF
POWDERED REFRIGERANT Filed Feb. 28, 1966 4 Sheets-Sheet 3

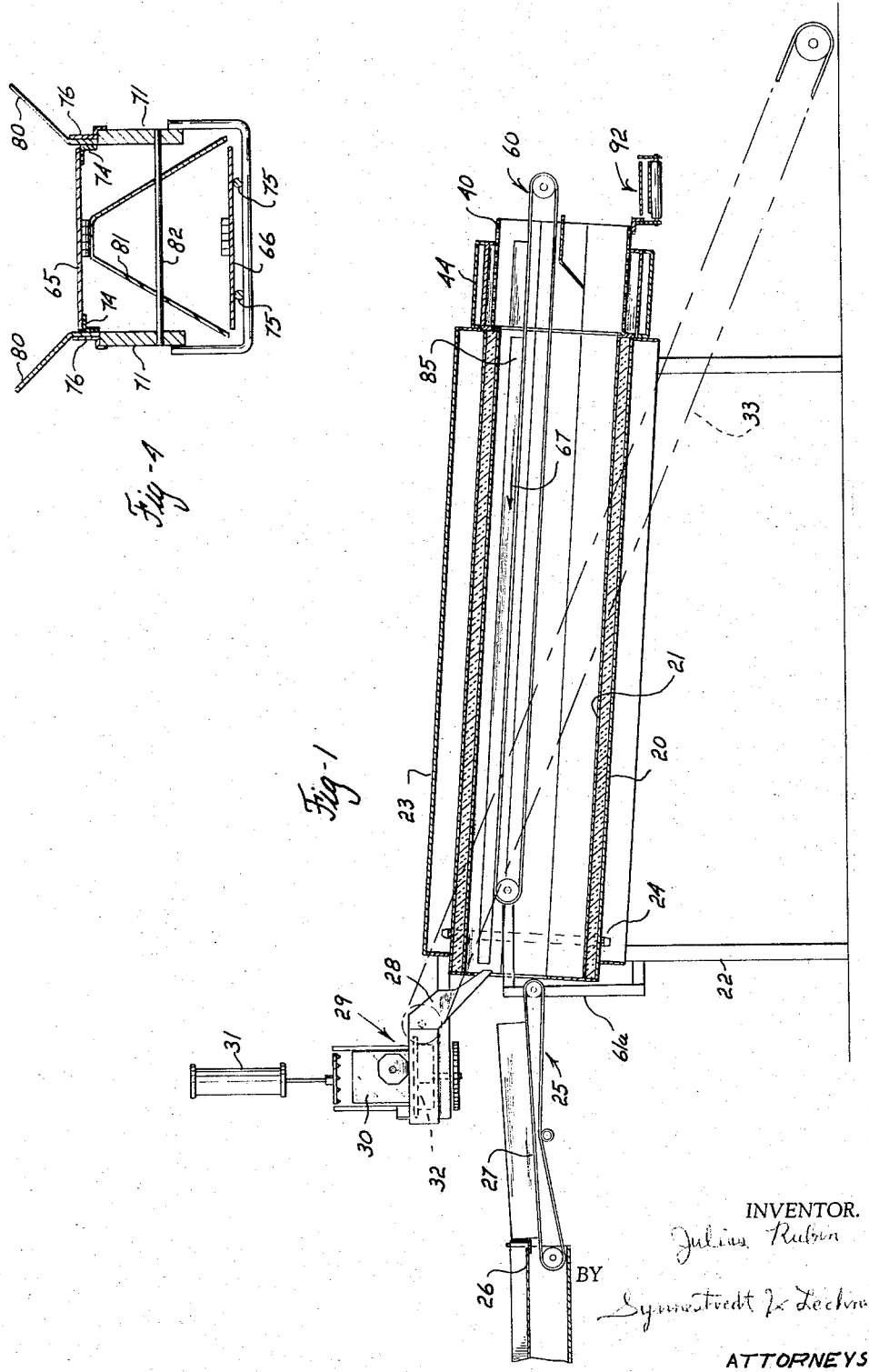

INVENTOR.
Julius Rubin
BY
Synnestvedt & Lechner
ATTORNEYS

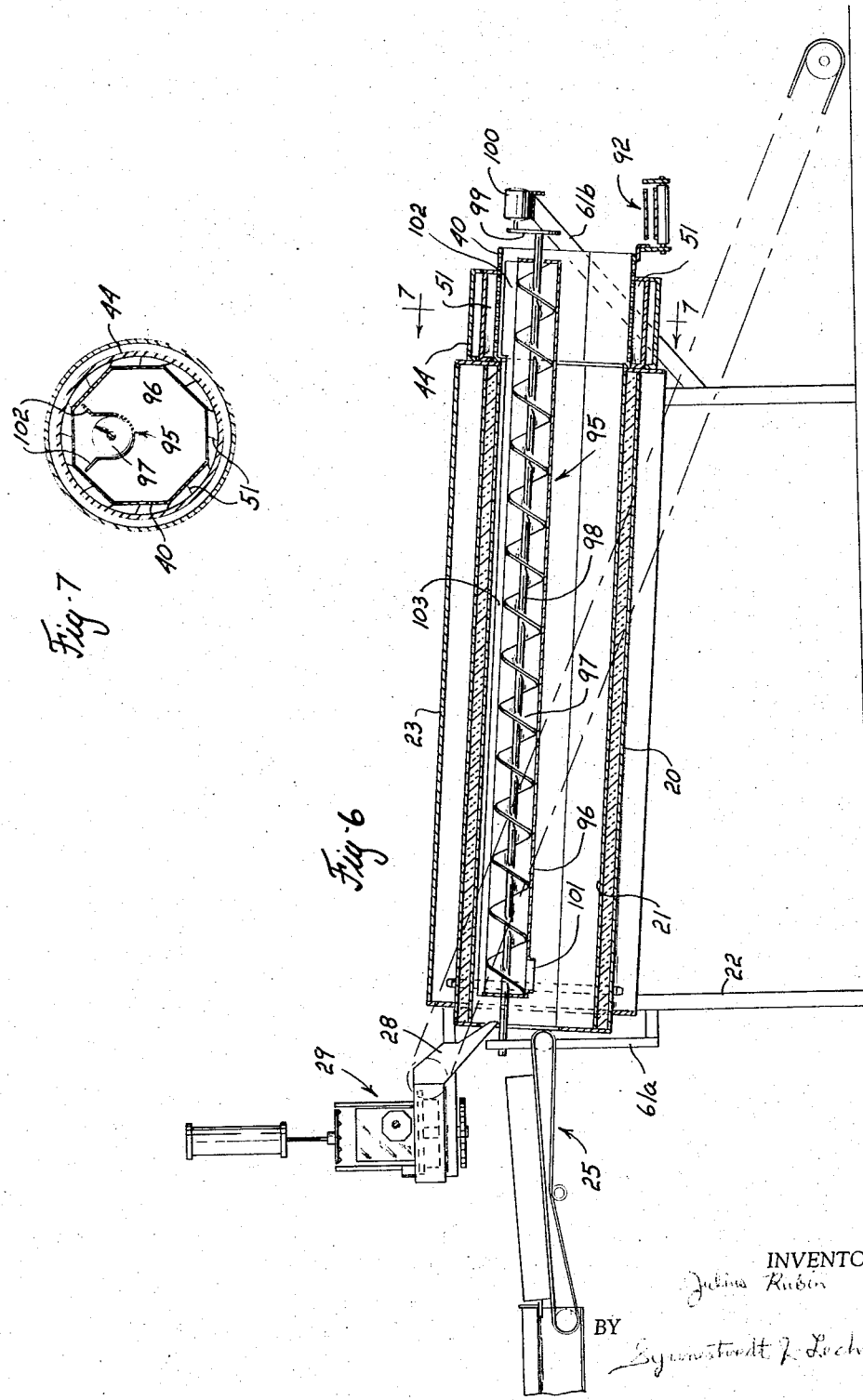

United States Patent Office 3,292,384
Patented Dec. 20, 1966

3,292,384
METHOD AND APPARATUS FOR CHILLING ARTICLES, ESPECIALLY FOOD ITEMS, BY THE USE OF POWDERED REFRIGERANT
Julius Rubin, Franklin Square, Nassau, N.Y., assignor to Thermice Corporation, Philadelphia, Pa., a corporation of Pennsylvania
Filed Feb. 28, 1966, Ser. No. 530,737
9 Claims. (Cl. 62—63)

This application is a continuation-in-part of my copending U.S. application Serial No. 395,649, entitled "Method and Apparatus for Quick Freezing Individual Food Items," filed September 11, 1964, and assigned to the assignee as this application. This application is also a continuation-in-part of my copending U.S. application Serial No. 517,287, entitled "Method and Apparatus for Chilling Articles, Especially Food Items," filed December 29, 1965, and assigned to the same assignee as this application.

This invention relates to the chilling of articles for a variety of purposes. Among the larger classes of articles which can be successfully chilled by the method and apparatus of this invention are individual or discrete items of food. The invention finds particular utility in applications where it is desirable or necessary to extract heat from articles quickly. Such operations can be appropriately called "quick chilling." Some quick chilling involves lowering of the temperature of the articles being chilled to a point below the freezing point. Such a quick chilling operation can be appropriately called "quick freezing."

The invention is particularly concerned with chilling and freezing operations and equipment in which the removal of heat from the articles to be chilled is carried out by mixing them with a powdered refrigerant, particularly granulated Dry Ice. In accordance with the invention the intermixing of the articles and powdered refrigerant is performed in a continuous throughput unit and the proportions of articles and Dry Ice fed through the unit are so adjusted that a mixture of chilled articles and powdered refrigerant appears continuously at the output end of the chilling unit. As is explained more fully in my copending applications referred to above, the foregoing operating condition is achieved by feeding refrigerant to the continuous throughput unit in quantities sufficient to establish and maintain a resident excess of powdered refrigerant in the unit, that is, a quantity of refrigerant, such as granulated Dry Ice, in excess of the amount required to chill the articles which are in the unit at any one time. Many of the features of the present invention are concerned with methods and equipment for effecting a separation of the Dry Ice from the chilled items appearing at the output end of the chilling unit and for recycling the separated Dry Ice back into the chilling unit for reuse.

The desired separation of powdered Dry Ice from the chilled articles presents several problems which are overcome by the method and equipment of the invention. The separation must be carried out without substantial damage to the chilled items. While the chilling operation, especially if it results in freezing of the articles, tends to strengthen them, many classes of articles are nonetheless relatively fragile and tend to become damaged if they are handled roughly. The nature of the powdered refrigerant, such as granulated Dry Ice, also presents some problems. These problems vary somewhat depending on the precise form of the Dry Ice powder. Some forms of the powder tend to be quite flocculent and tend to pack or bridge. A further problem arises from the fact that the separating and recycling equipment operates in a cold, moist atmosphere and the water vapor in the atmosphere has a tendency to form water ice on the parts of the equipment. In accordance with the invention the parts are kept simple in design and are so configured that their operation is not hampered materially by such water ice.

It is an object of this invention to provide a method and apparatus for chilling articles by the use of a granulated refrigerant in a continuous throughput unit in which efficient separation of articles and powdered refrigerant is accomplished.

It is a further object to accomplish efficient recycling of separated powdered refrigerant and the reuse thereof.

Another object of the present invention is the provision of a powdered refrigerant separating and recycling means which overcomes problems arising from the properties of the powdered refrigerant, the articles being chilled, and the mixture of such articles and refrigerant.

Still another object of the invention is the provision of separation and recycle means for powdered refrigerant which is simple in construction and efficient in operation in a cold environment.

The above objects and purposes, together with other objects and purposes may be more readily understood by a consideration of the detailed description which follows together with the accompanying drawings in which:

FIGURE 1 is a somewhat simplified sectional elevational view of a chilling unit constructed in accordance with the invention, with various parts omitted for the sake of clarity, the view being similar to FIGURE 6 of my copending application Serial No. 517,287, referred to above;

FIGURE 2 is a fragmentary sectional elevational view, with some parts broken away, on an enlarged scale as compared with FIGURE 1, of separating and recycling equipment provided in accordance with the invention at the exit end of the unit shown in FIGURE 1;

FIGURE 4 is a fragmentary sectional elevational view of a portion of the recycle equipment shown in FIGURES 2 and 3, the view being taken on the line 4—4 of FIGURE 2;

FIGURE 5 is a fragmentary sectional elevational view of a portion of the separating and recycling equipment of an alternate embodiment of the invention;

FIGURE 6 is a somewhat simplified sectional elevational view of a chilling unit forming an alternate embodiment of the invention, with various parts omitted for the sake of clarity; and FIGURE 7 is a fragmentary sectional view taken on the line 7—7 of FIGURE 6.

Figure 3:
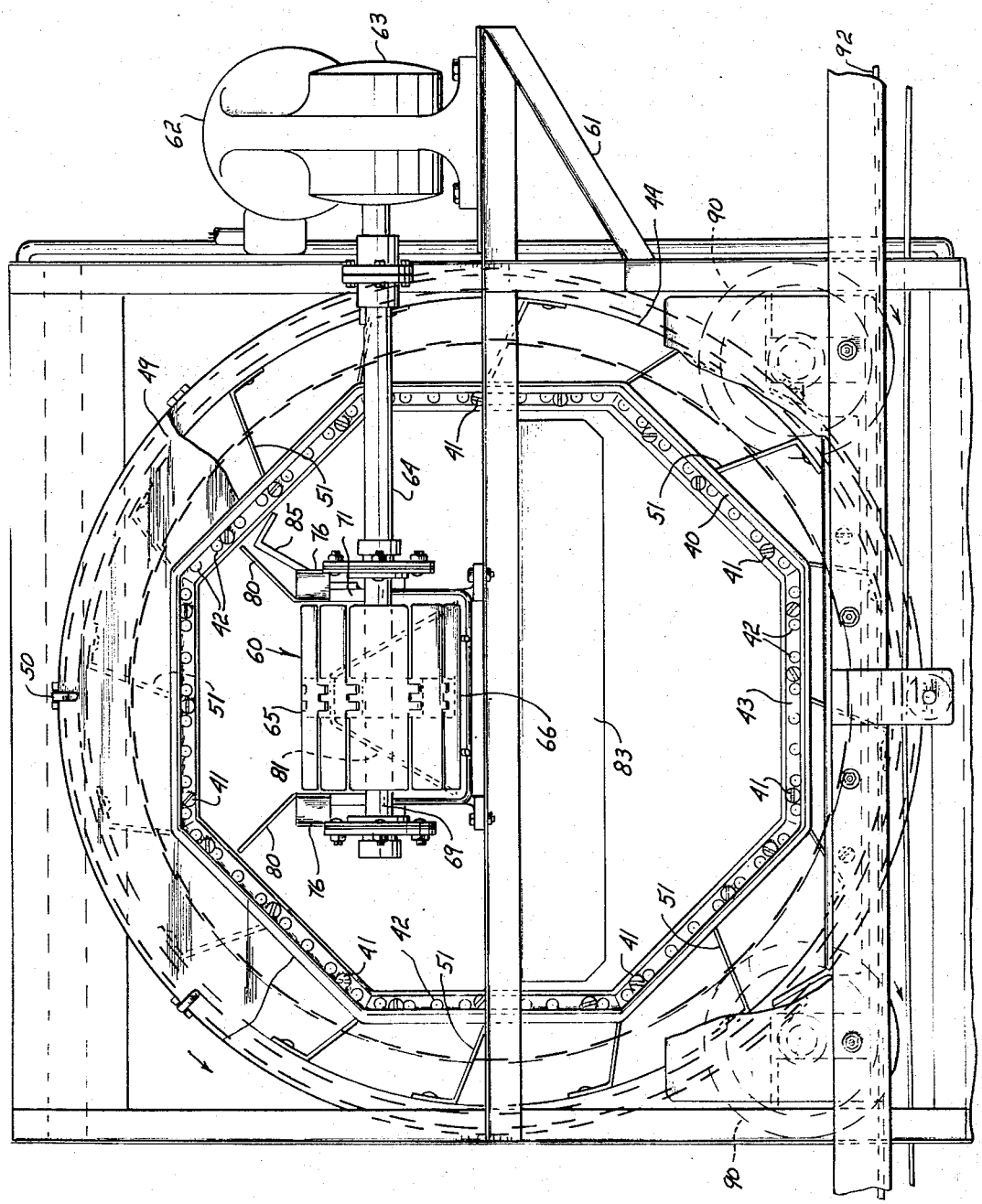
FIGURE 3 is an end elevational view with some parts broken away, of the separating and recycling equipment shown in FIGURE 2, the view being taken looking toward the left in FIGURE 2.

Attention is first directed to FIGURE 1 which, as explained above, is similar to FIGURE 6 of my copending application Serial No. 517,287. Many of the features of the unit shown in FIGURE 1 are more fully described in said application and are claimed there. For the purposes of the present invention it can be pointed out that the unit of FIGURE 1 includes a tumbler 20 having liner 21 of octagonal shape to provide a passage through the tumbler of octagonal configuration. The tumbler 20 is mounted for rotation on frame 22 and is surrounded by protective housing 23. Rotative power for the tumbler is provided through drive sprocket 24 from a motor which is not shown on the figure. As can be seen in FIGURE 1, the tumbler 20 is tilted downwardly from its entrance end (at the left) to its exit end (at the right).

Food items or other articles to be chilled are fed into the entrance end of the tumbler by means of the input conveyor designated generally as 25. As explained in my copending application the input conveyor may include a main conveyor 26 and an auxiliary conveyor 27. Food items fall off the end of auxiliary conveyor 27 into the entrance end of tumbler 20. Granulated Dry Ice is fed into the entrance end of tumbler 20 by means of feed chute 28. In the embodiment of FIGURE 1 the granulated Dry Ice is formed right at the entrance end of the tumbler from block Dry Ice by means of the Dry Ice shaving unit designated generally as 29. The constructional and operational features of this shaving unit are described and claimed in my copending application. Here it can be pointed out that a block of Dry Ice such as that indicated at 30 is held in the shaving unit and is pushed by the cylinder and piston device 31 against the blades of shaver 32. Granulated ice resulting from the shaving of block Dry Ice is fed into chute 28 and thence into the entrance end of tumbler 20. The block Dry Ice feed conveyor 33 shown in dot and dash outline delivers block Dry Ice to the shaving unit 29. This conveyor can be conveniently mounted on the frame 22 beside tumbler 20.

The bed of Dry Ice and items to be chilled formed in the tumbler 20 slides downwardly through the tumbler as the tumbler is rotated, being repeatedly overturned and mixed as it slides, and a portion of it continually appears at the exit end.

The separating and recycling equipment can best be understood from FIGURE 1, where it is shown in conjunction with the chilling tumbler, and from FIGURES 2, 3, and 4 where it is shown in greater detail and on an enlarged scale. At the output end of the tumbler 20 there is mounted an octagonal separator tube 40. The separator tube 40 is mounted for rotation with the tumbler, by being attached thereto with screws 41 (see FIGURE 3). The tube 40 may be constructed from a foraminous sheet or from screen material. The size of the holes 42 in the tube is selected so that the openings are large enough, when compared to the size of the Dry Ice granules, to allow the granules to pass through the holes readily. However, the size of the holes 42 is also selected with the size of the articles to be chilled in view, and the holes are sized so that they are small enough that such articles will not pass through. The shape of the holes is not critical and they may be of any convenient shape, although round holes are quite satisfactory. Similarly, while it is preferred that the holes 42 be distributed substantially over the entire surface of the separator tube 40, one can, if it is desired, omit the holes over a portion of the surface. In the embodiment of FIGURES 1 through 4, the separator tube 40 is octagonal in shape, like the liner 21 of the tumbler 20. It is, however, somewhat larger in diameter than the liner 21 so that the food and powdered Dry Ice, upon entering the separator tube from the tumbler, fall over lip 43. Such falling action assists somewhat in the separation of the food and Dry Ice, but this advantage can be foregone if it is desired to have the tube 40 of the same or even somewhat smaller diameter than the liner 21.

An insulating cylinder or outer tube 44 is mounted for rotation on the tumbler 20 coaxially with and outside of the separator tube 40. The insulating cylinder 44, like the tumbler 20, has an outer shell 45 and a liner 46. Between the shell 45 and the liner 46 there is provided insulating material 47, such as polyurethane foam, which, like the similar insulating material of the tumbler, serves to retard the flow of heat into the unit. As can be seen from FIGURE 2, the insulating tube 44 is somewhat shorter in length than the separator tube 40, but it is made long enough so that substantially all of the granulated Dry Ice entering the separator tube 40 falls through the perforations therein into the space between the separator tube 40 and the tube 44.

From the foregoing it can be seen that the separator tube 40 and the insulating tube 44 together define a generally annular space surrounding the separator tube 40. The left hand end of this space, as FIGURE 2 is drawn, is closed off by means of plate 48, which also serves as a means of attachment of cylinder 44 to tumbler 20. The right hand end of the space, as FIGURE 2 is drawn, is also closed by means of circular plate 49 which is held in position on tube 44 by clips 50.

A series of baffles 51 is mounted in the annular space between the insulating cylinder 44 and the separator tube 40. The baffles are bolted or otherwise attached to the liner 46 of the insulating cylinder 44 and extend generally radially inwardly. As can best be seen in FIGURE 3 the baffles are pitched somewhat instead of being perfectly radial although perfectly radial orientation of the baffles can be used if desired. The baffles are pitched, in the preferred arrangement, so that the edge of a given baffle which is adjacent the separator tube 40 is displaced in the direction of rotation of the tumbler and separator unit (counter clockwise in FIGURE 3 as indicated by arrow 52) from the edge of the baffle which is adjacent the liner 46 of insulating cylinder 44. As appears in FIGURE 3, the baffles 51 are more or less evenly circumferentially distributed around the annular space between the tubes 40 and 44, although some variation in the spacing is permissible. FIGURE 3 also shows that the radial dimension of the baffles varies somewhat, a variation resulting from the fact that the outer tube 44 is cylindrical while the inner tube 40 is octagonal. It is preferred, however, that each baffle substantially bridge the space between the outer tube 44 and the inner tube 40. FIGURE 2 shows that the baffles 51 extend substantially the full length of the insulating cylinder 44.

Dry Ice recycle means are provided to receive the Dry Ice which has been separated from the food and to return it to a point upstream in the tumbler for reuse. In the embodiment of FIGURES 1 through 4 the recycle means takes the form of recycle conveyor 60 which, as can be seen in FIGURE 1, extends from the vicinity of the separator tube 40 at the exit end of the tumbler to a point well upstream in the tumber 20 near the entrance end thereof. As can be seen in FIGURES 2 and 3, the conveyor 60 is mounted, at the exit end of the tumbler, on frame 61 which also carries drive motor 62 and gearbox 63. Driving power is provided to the conveyor through gearbox 63 and drive shaft 64. The upstream end of the conveyor 60 is supported on frame 61a as shown in FIGURE 1.

In the embodiment of FIGURES 1 through 4, the conveyor 60 is of the link belt type having an upper run 65 and the lower run 66. As indicated by the arrow 67 on FIGURES 1 and 2 the conveyor is operated so that the upper run 65 moves in the direction upstream of the tumbler. The conveyor is driven through drive sprocket 68 at the downstream end of the conveyor which sprocket is mounted on shaft 69. Shaft 69 is journaled on mounting plates 70 which are bolted to the side plate 71 of the conveyor. The mounting plates 70 are slotted so that their position with respect to their side plates 71 can be varied. This arrangement is of advantage since it makes adjustment of the conveyor tension quite simple.

The conveyor belt is formed of individual flat links 72 which may be of a suitable material such as nylon which withstands a cold environment well, and which are connected to one another by hinges 73. The hinges 73 also serve to engage driving sprocket 68. The upper run of the belt is supported by angled support members 74 (see FIGURES 2 and 4) throughout its length so that it will not unduly sag. Similarly, the lower run of the belt is supported throughout its length by rails 75.

The conveyor 60 is provided with side rails 76 along the upper run 65 to prevent Dry Ice from falling off as it is carried upstream in the tumbler. The side rails 76 are mounted on the side plates 71 of the conveyor.

The conveyor 60 is equipped with several Dry Ice guides in the region where it passes through the separator tube 40. The first of these consists of a pair of angled side plates 80 which are attached to the side plates 71 of the conveyor and which project upwardly and outwardly above the upper run 65 of the conveyor. The side plates are so positioned that powdered Dry Ice falling onto them is directed onto the upper run of the conveyor. The conveyor 60 is also provided with an internal baffle or deflector 81 which is mounted between the upper and lower runs of the conveyor in the vicinity of the separator tube. As can best be seen in FIGURE 4, the internal baffle 81 is in the shape of an inverted V and is so positioned that the point of the V is immediately below the upper run 65 while the legs of the V extend outboard of the lower run 66. The function of the internal baffle 81 is to deflect powered Dry Ice which may fall through the upper run 65 away from the top surface of the belt links in lower run 66. If powdered Dry Ice is permitted to collect on the upper surface of the run 66, it may tend to interfere with the engagement of sprocket 68 with belt links. As can be seen in FIGURE 4, the internal baffle 81 is held in position by rods 82 connected to side plates 71. Exterior baffle 83 is mounted beneath the conveyor 60 on frame 61. As can be seen in FIGURE 3, the exterior baffle extends substantially the full diameter of separator tube 40 and deflects powdered Dry Ice falling on it upstream in the separator tube 40.

As explained in my copending applications above referred to, in the tumbler units of the kind illustrated in FIGURE 1 it is desirable to provide a scraper bar to knock down food and Dry Ice which may tend to stick somewhat on the walls of the tumbler. In a unit constructed according to the invention the scraper bar may be conveniently attached to the frame of the conveyor and such a scraper bar appears at 85 in FIGURES 1 and 2, where it is attached to side plates 71 of the conveyor 60.

FIGURES 2 and 3 also illustrate certain structural features of a tumbler unit equipped with recycle equipment. The tumbler 20 is rotatably supported on bearing rollers 90 attached to frame 22. A wear band 91 is interposed between the rollers and the outer surface of the tumbler. FIGURES 2 and 3 also show that the frame 61 which supports conveyor 60 is attached to frame 22 of the tumbler. This frame also supports takeaway conveyor 92 which is positioned at the exit end of the separator tube 40.

The operation of the separator and recycle equipment of the embodiment of FIGURES 1 through 4 is as follows. As the bed of mixed items being chilled and granulated Dry Ice moves through tumbler 20, a portion of it enters the interior of the separator tube 40, which, it will be remembered, rotates with the tumbler. The food or other chilled items and Dry Ice move axially through the separator tube toward the exit end thereof. As the mixture moves across the surface of the tube 40, the Dry Ice falls through openings in the tube, but chilled items do not. The chilled items slide to the exit end of the tube under the influence of gravity and fall onto the take-away conveyor 92.

The powdered Dry Ice, when it falls through the holes in separator tube 40, falls into the annular space between the separator tube and insulating tube 44. Tube 44 also rotates with the tumbler. As the tumbler continues to rotate, the powdered Dry Ice which has fallen into the annular space in the lower portion thereof is carried upwardly by baffles 51 which rotate with insulating cylinder 44. When a given baffle 51 is elevated during the course of a revolution of tube 44, it reaches a point where the Dry Ice spills off it. The Dry Ice spilling off the baffle falls through the perforate wall of separator tube 40. Some of the Dry Ice falls directly onto the upper run 65 of the conveyor 60. Other portions of the spilling Dry Ice fall onto angled plates 80 which direct the Dry Ice onto the upper run of conveyor 60. Substantially all of the ice which is deposited on the conveyor 60 is carried upstream by the conveyor and is dumped from the upper end of the conveyor onto the bed of Dry Ice and items to be chilled near the entrance end of the tumbler.

Any powdered Dry Ice which finds its way through the upper run 65 of the conveyor, or around the edges thereof, falls onto the V shaped baffle 81 and thence onto the lower surface of separator tube 40. Similarly, any Dry Ice which spills from baffles 51 but misses both the upper run of conveyor 60 and the angled plates 80 falls into the lower portion of separator tube 40 or onto baffle 83 and then into the lower portion of tube 40. By far the greater percentage of Dry Ice falling off baffles 51 is deposited on conveyor and is carried upstream in the tumbler.

Attention is now directed to FIGURE 5 which shows an alternate form for the separator tube 40. In this embodiment the tube 40' is cylindrical in cross section rather than polygonal. It is divided into segments 100 which are hingedly mounted by means of supporting clips 101 on baffles 51'. Such a flexible mounting of the segments is advantageous in some circumstances because, when the tumbler is operated in a very moist atmosphere, some Dry Ice may tend to pack against the baffles 51' as indicated at 102 instead of falling freely from the baffles. During periodic shutdowns the hinged segments 100 can be lifted and the packed Dry Ice 102 can be scraped out.

FIGURES 6 and 7 show an alternate embodiment of the invention in which a somewhat different type of recycle conveyor from that illustrated in the embodiment of FIGURES 1 through 4 is employed. However, much of the equipment shown in FIGURES 6 and 7 is substantially similar to that shown in FIGURE 1, and many of the parts are therefore given the same reference characters. The embodiment of FIGURE 6 thus includes a tumbler 20 having an octagonal liner 21. The tumbler 20 is mounted for rotation on the frame 22 and is surrounded by a protective housing 23. Input of items to be chilled is accomplished by means of input conveyor 25 and input of granulated Dry Ice is achieved by means of feed chute 28 and Dry Ice shaver 29. Chilled items issuing from the exit end of the tumbler are deposited on take-away conveyor 92. All of the equipment mentioned thus far is constructed and operates in substantially the same manner as the corresponding equipment shown in FIGURE 1 and described in connection with that figure.

At the output end of the tumber of FIGURE 6 there is mounted a separator tube 40 and a coaxial insulating cylinder tube 44. The generally annular space between the separator tube and the insulating tube is divided by a series of angled baffles 51 as seen best in FIGURE 7. The structure of these parts is substantially the same as the structure of the corresponding parts shown in the enlarged views of FIGURES 2 and 3, and reference should be made to those figures for an understanding of the details of construction of the separator tube 40, the insulating tube 44, and the baffles 51, as well as for an understanding of the constructional features of various other parts which cooperate with these parts.

In the position which is occupied by the recycle conveyor 60 in FIGURE 1, there is substituted in the embodiment of FIGURES 6 and 7, a recycle conveyor in the form of auger 95. The auger is supported at the input end of the conveyor by the frame member 61a and at the exit end of the conveyor by the frame member 61b. The auger 95 comprises trough 96 which preferably open at the top and generally U-shaped in cross section, as appears best in FIGURE 7. Mounted for rotation in the trough 96 is an auger screw 97 carried on shaft 98. The shaft 98 is journaled through support member 61a at the entrance end of the tumbler and is connected through drive train 99 to drive motor 100 at the exit end of the tumbler. The trough 96 has an opening 101 in the bottom thereof at the upstream end. At the downstream end of the trough 96, it is provided with upwardly and outwardly extending plates 102. The trough is also desirably provided with an outwardly extending scraper element 103 extending along the upper edge of the trough on one side, for example, the right hand side as FIGURE 7 is drawn. Scraper element 103 runs substantially the full length of the trough. The scraper element 103 serves substantially the same function as the scraper bar 85 in the embodiment of FIGURE 4. It should also be noted that the auger trough 96 is closed at the ends.

The alternate form of separator tube and baffle construction illustrated in FIGURE 5 may be employed in a tumbler unit having a recycle auger of the kind illustrated in FIGURE 6.

The operation of the separator and recycle equipment of the embodiment of FIGURES 6 and 7 is as follows. The tumbler 20 is rotated, and the separator tube 40 and insulating tube 44 rotates with it. As the tumbler rotates a portion of the bed containing a mixture of items being chilled and granulated Dry Ice moves from the tumbler into the separator tube. Here the Dry Ice falls through the holes in the separator tube and the chilled items slide through the tube onto the take-away conveyor 92. The powdered Dry Ice which has fallen through the holes in the separator tube 40 into the annular space between it and insulating tube 44 is lifted by the baffles 51 in the course of rotation of the insulating tube. As each baffle reaches a point near the top of tube 44 during a given revolution, the Dry Ice spills off the baffle. Some of the spilling Dry Ice falls directly into the auger 95, and substantially all of the rest of the spilling Dry Ice falls onto the angled plates 102 and thence into the auger. The auger screw 97 is rotated by the motor 100 and forces the Dry Ice which has been deposited in the auger to upstream end of the auger. There it falls through opening 101 onto the bed of Dry Ice and items to be chilled formed at the upper end of the tumbler. In this manner very efficient and substantially total recycle of the separated Dry Ice is accomplished.

I claim:
1. Apparatus for chilling articles by the use of powdered dry ice comprising an elongated rotatable tumbler having an input end and an output end, said tumbler being adapted to hold and mix a bed of articles being chilled and powdered Dry Ice passing continuously therethrough, perforate separator tube means at the output end of said tumbler and rotatable therewith, a second tube mounted at the output end of said tumbler for rotation therewith, said second tube being positioned radially outwardly of said separator tube means and defining therewith an annular space having a perforate inner surface and an imperforate outer surface, a plurality of generally radially oriented baffles disposed in said annular space, and conveyor means mounted within said tumbler and separator tube means and extending from said separator tube means to a point upstream in said tumbler.

2. Apparatus in accordance with claim 1 and further including upwardly extending angled side plates mounted on the portion of said conveyor means which passes through said separator tube.

3. Apparatus in accordance with claim 1 in which said conveyor means comprises an auger type conveyor.

4. Apparatus in accordance with claim 1 in which said conveyor means comprises a belt type conveyor.

5. Apparatus in accordance with claim 4 and further comprising deflector means mounted on the portion of said conveyor means which passes through said separator tube means, said deflector means being positioned beneath the upper run of said belt type conveyor and above the lower run of said conveyor.

6. Apparatus in accordance with claim 1 and further comprising drive means for said conveyor means mounted externally of said tumbler and said separator tube means.

7. Apparatus in accordance with claim 1 in which said baffles are secured to said second tube, and in which said separator tube means is divided into segments, and said segments are flexibly connected to said baffles for individual manipulation to provide access to said annular space from the interior of said separator tube means.

8. Apparatus in accordance with claim 3 and further including an upwardly open auger trough and in which a scraper element is mounted along one edge of said trough in position to knock down food and Dry Ice sticking to the walls of the tumbler.

9. A method for separating and recycling powdered Dry Ice from a moving chilling bed consisting of an intimate mixture of powdered Dry Ice and chilled items comprising passing a portion of said bed over a perforate surface admitting passage of powdered Dry Ice downwardly therethrough but blocking such downward passage of chilled items, catching the powdered Dry Ice passing through said perforate surface in a compartment having said surface as the top wall thereof, removing said compartment from the vicinity of said bed, overturning said compartment to pass the powdered Dry Ice therein through said perforate surface, collecting Dry Ice spilled from said compartment, and conveying the collected Dry Ice to a point in said bed for reuse.

References Cited by the Examiner
UNITED STATES PATENTS 3,213,634  10/1965  Granata _____ 62—384
3,214,928  11/1965  Oberdorfer _____ 62—63

ROBERT A. O'LEARY, *Primary Examiner.*

W. E. WAYNER, *Assistant Examiner.*